Sept. 17, 1935.  N. JAPOLSKY  2,014,737
ALTERNATING CURRENT COMMUTATOR MACHINE
Filed Jan. 15, 1932  3 Sheets-Sheet 1

NICHOLAS JAPOLSKY
INVENTOR
BY Haseltine, Lake & Co.
ATTORNEYS

INVENTOR
NICHOLAS JAPOLSKY
BY Haseltine, Lake & Co.,
ATTORNEYS

INVENTOR
NICHOLAS JAPOLSKY

Patented Sept. 17, 1935

2,014,737

UNITED STATES PATENT OFFICE 2,014,737

ALTERNATING-CURRENT COMMUTATOR MACHINE

Nicholas Japolsky, Highgate, London, England

Application January 15, 1932, Serial No. 586,774
In Great Britain January 19, 1931

4 Claims. (Cl. 172—274)

This invention relates to alternating-current commutator machines of the type wherein the excitation is derived from an independent source of current supply. It is known that such a machine, with a compensated working winding and with an excitation winding supplied by current from an outside source, can be used for working at different frequencies independently of the speed. In particular it can be used as a constant-speed generator of alternating current of variable frequency.

The chief object of the present invention is to provide means for reducing the size of the source of excitation of an alternating-current commutator machine and to make the characteristic of the machine, i. e., the relationship between the frequency and the voltage, correspond to the actual requirements. In particular the invention is applicable to a case where the alternating-current commutator machine is working as a generator of variable-frequency current.

The principle of the aforesaid machine with a compensated working winding and with excitation from an external source is described in various papers, for example in the paper by N. Japolsky and S. Press published in "Engineering" of the 9th and 23rd July and the 6th August 1926. It is therefore unnecessary to describe this machine in detail in the present specification. One of the features of the said machine is the practical absence of mutual induction between exciting current and the working current. The source of excitation (termed the exciter) provides only the current required for the production of the magnetic field in the machine.

According to the present invention the excitation circuit is provided with condensers and in this way the amount of power required from the exciter can be reduced. The beneficial action of suitably arranged condensers is accentuated by the fact that in the majority of practical cases it is required that the exciting current shall increase with the frequency, while, as is well known, the influence of the condensers upon the current in the circuit also increases as the frequency rises. These condensers, in conjunction with the resistances and inductances suitably arranged in the excitation circuit, provide means for adapting the characteristics of the machine to the actual requirements.

The aforesaid condensers may be arranged in series or parallel with the excitation winding or a series-parallel combination may be adopted; also resistances and inductances may be associated with the excitation winding, being preferably connected in series with each other and with the excitation winding and being shunted by condensers.

In order that the invention may be clearly understood and readily carried into effect, it will now be described more fully with reference to the accompanying drawings which illustrate, by way of example, various forms of alternating-current commutator machines in accordance therewith and wherein:—

Figure 1:
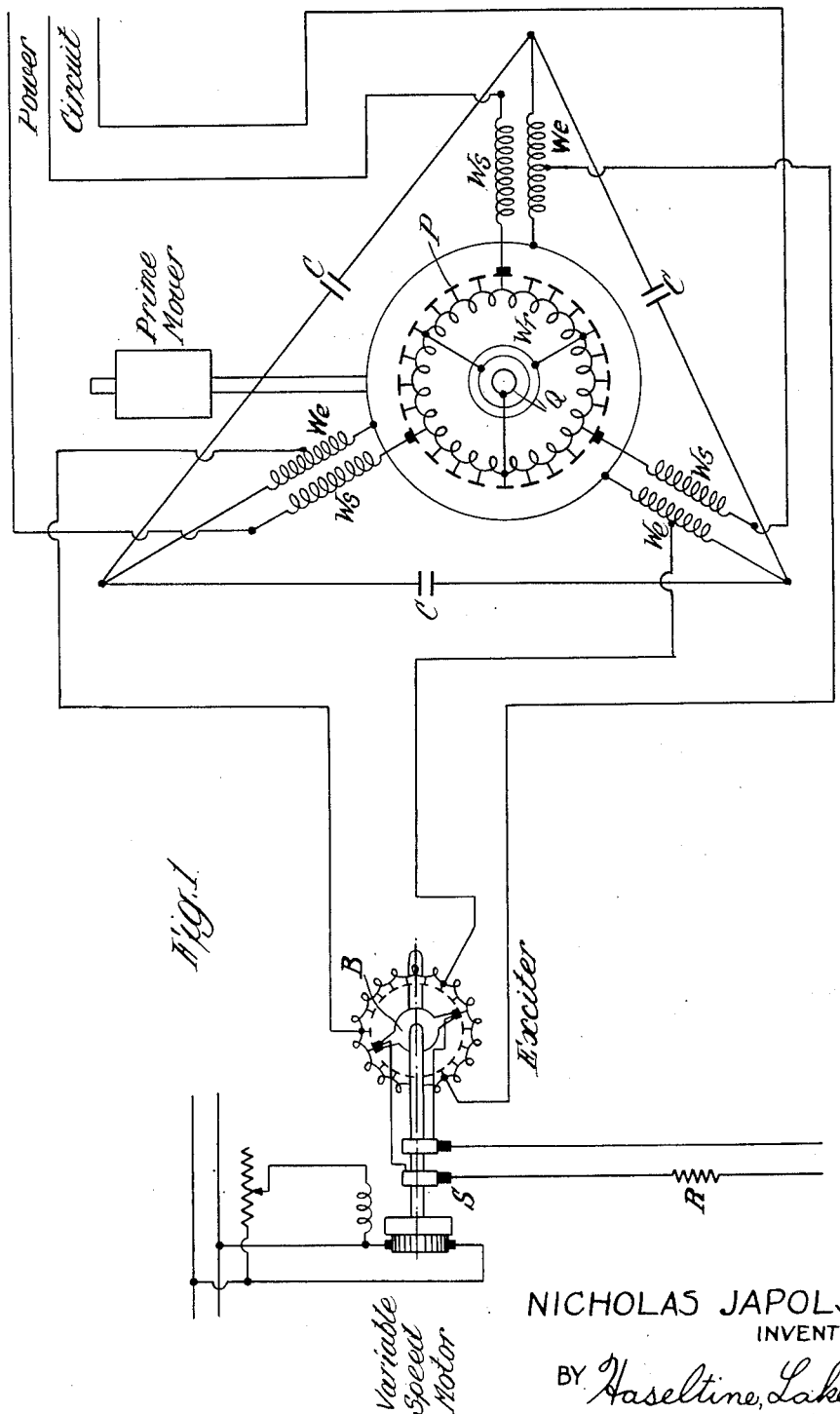
Figure 1 is a schematic diagram of a machine made according to the invention.

As is well known, the alternating-current commutator machine need not necessarily be provided with a separate excitation winding as it is possible to combine this winding with the working winding, for example, the exciting current may be supplied to the brushes on the commutator or those on the slip rings which are connected to the rotor winding. The present invention may be applied in such a case as well as in the case wherein the machine has a separate excitation winding, but for the sake of clarity and in order to avoid unnecessary complication, the invention will be mainly illustrated by examples employing a separate excitation winding. Figure 1 diagrammatically illustrates a general scheme of the essential elements of a machine embodying the present invention, wherein there are working windings $Ws$ and $Wr$, respectively, on the stator and rotor (which, being of any usual construction, it is thought superfluous to illustrate) and an excitation winding $We$ with which there are connected condensers C, while a commutator P and slip rings Q are also indicated. The exciter is energized from an independent source of excitation through a resistance R, brushes and slip rings S and brushes B rotating at variable speed on a commutator which is connected to the armature in the usual way with the only difference that in this case they are both stationary. The armature is represented merely by a ring surrounding the rotating brushes, the winding being connected at three equidistant points to the excitation winding by means of three conductors supplying current to that winding. In the remaining figures, unless otherwise stated, only the excitation winding is shown, as the mutual positions of the working and the excitation windings are well known, and may be readily visualized by analogy from Figure 1. The excitation winding is depicted as a system of series-connected resistances and inductances, designated by the letters $r$ and $r_1$ and $L$ and $L_1$ respectively. The indication of resistances on the diagrams does not necessarily mean that high resistance conductors are deliberately inserted in circuit, but only shows that the resistance cannot be disregarded, especially when the machine operates at a very small or zero frequency.

Figure 2:
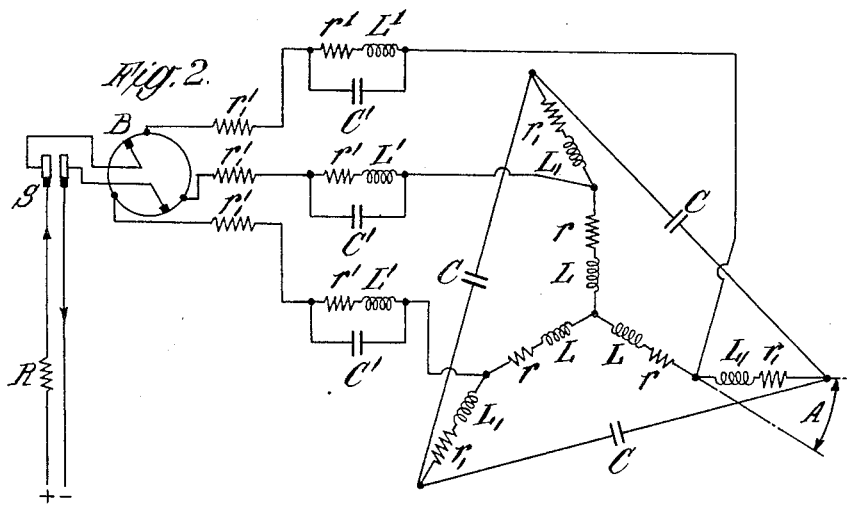
Figures 2 to 6 are diagrams of three-phase machines.

Referring to Figure 2, the exciting current passes through resistances $r'_1$ and series-connected resistances $r'$ and inductances $L'$, which are, in their turn, shunted by a capacity $C'$. The exciting current is as indicated supplied to an intermediate point of each of the three phases of the excitation winding which, in this instance, are connected purely in star, the parts $r$, $L$ and $r_1$, $L_1$ respectively in each phase being mutually displaced in the magnetic field of the machine by an angle A. The star points are connected by capacities C.

When the frequency is zero no current passes through the condensers, and the self-induction of the circuit has no influence, so that the exciting current is only determined by the resistance of the circuit. When the frequency rises, the unavoidable inductance of the excitation circuit tends to reduce the exciting current. According to the invention this effect is counteracted by the action of the condensers. The condensers $C'$ are in series with the excitation winding, while the condensers C are in parallel with it, and, accordingly, they play different parts. While the condensers $C'$ reduce the voltage which is required from the exciter, the condensers C supply part of the exciting current and hence reduce the current required from the exciter. Of course, as is well known, such reduction of voltage or of current will continue until the frequency reaches the so-called resonance frequency which depends upon the relationship of the different elements of the circuit and may be different in respect of each condenser.

Figure 3:
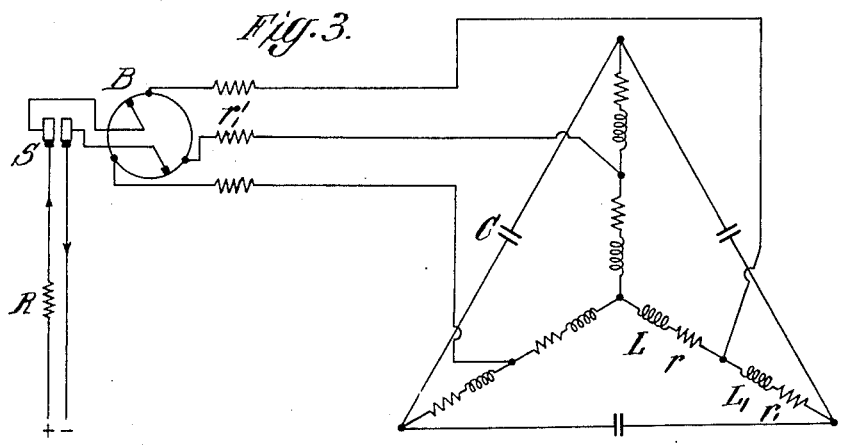

It will be understood that the groups of elements $r'$, $L'$, $C'$ may be omitted or their positions altered; also that the phase angle A may be equal to or different from zero. Thus in Figure 3 there is shown an excitation circuit similar to that in Figure 2, but simplified owing to the fact that the elements $r'$, $L'$, $C'$ are omitted and the portions $r$, $L$ and $r_1$, $L_1$ in the respective branches coincide in phase.

Figure 4:
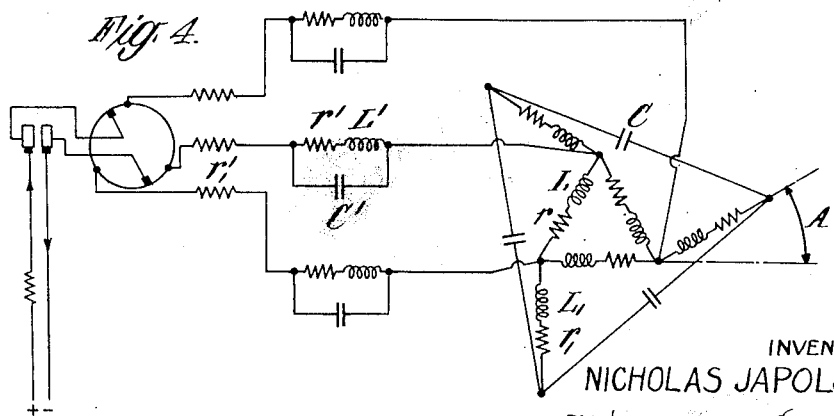
Figure 5:
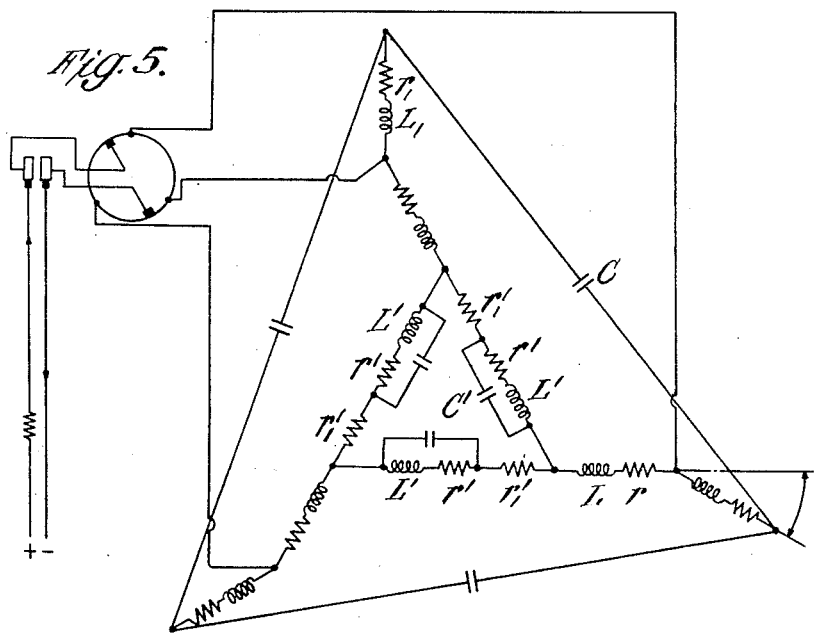

The various parts of the circuit, which in the above-described arrangements are connected in star may also be connected in mesh. For instance, referring to Figure 4, the parts of the excitation winding $r$, $L$ are connected in mesh, while, according to Figure 5, this arrangement is adopted in respect of the elements $r'_1$, $r'$, $L'$, $C'$; the resistances $r'_1$ or the groups of elements $r'$, $L'$, $C'$ may themselves be connected as in the preceding figures.

Figure 6:
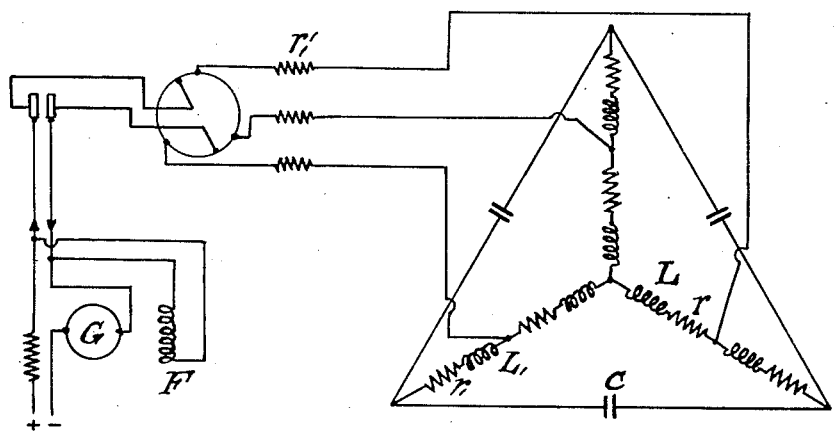

In the above-described examples, illustrating the present invention, a definite type of exciter was assumed, but the present invention may be used with any exciter, for example, with one of those described in the article in "Engineering" above referred to or with an exciter of different type. As shown in Figure 6, the voltage of an exciter supplying the current to an excitation circuit in accordance with the invention may be boosted by an additional D. C. generator G.

The voltage of the exciter is boosted up by the generator G, provided with an independent field winding F the terminals of which are connected to the terminals of the exciter. By a suitably designed field winding, which may be calculated by well-known methods, the direct current passing through the exciter which, generally speaking, falls with increased output of the latter, may be made constant or even to increase with the output; this would increase the arbitrariness of the characteristic between the frequency and the exciting current.

The analogy between the application of the present invention to three-phase and more than three phase systems is so close that there is no need for further illustrations.

Of course the diagrams given represent only examples of the application of the invention; the excitation circuit may be sub-divided and condensers inserted in it directly or by means of a transformer in many different ways, in each case resulting in the effect in accordance with the present invention.

As has been described in various prior patent specifications, the alternating-current commutator machine working as a variable-frequency generator may be used for supplying induction and synchronous motors at varying speeds and for the synchronous control of the movements of a body from a distance. In such applications of the machine the present invention is especially useful.

What I claim and desire to secure by Letters Patent of the United States is:—

1. In an alternating-current machine having a stator, a rotor, working windings on said stator and said rotor, and a commutator and conducting means making contact with the latter, the combination of a polyphase excitation winding, a condenser connected across each adjacent pair of phase sections of said excitation winding, an exciter for said machine comprising an armature, connections between said armature and intermediate points respectively in the phase sections of said excitation winding, a commutator in operative connection with said armature and brushes making contact with said commutator and connecter to a source of excitation independent of the power circuit of said working windings.

2. An alternating-current machine according to claim 1, wherein the two parts into which each of the phase sections is divided by said intermediate point are closely interconnected magnetically.

3. An alternating-current machine according to claim 1, wherein there is inserted in each of said connections between said armature winding and said excitation winding, a resistance and inductance in parallel with a condenser.

4. An alternating current machine according to claim 1, wherein the source of excitation is connected to the brushes by two lead wires and said source includes a direct current generator having field winding connected across said two lead wires.

NICHOLAS JAPOLSKY.